Nov. 14, 1961  C. E. KRAUS  3,008,337
TOROIDAL TYPE TRANSMISSION
Filed Dec. 11, 1959  6 Sheets-Sheet 2

INVENTOR
CHARLES E. KRAUS
BY *Victor D. Behn*
ATTORNEY

Nov. 14, 1961 C. E. KRAUS 3,008,337
TOROIDAL TYPE TRANSMISSION
Filed Dec. 11, 1959 6 Sheets-Sheet 5

INVENTOR.
CHARLES E. KRAUS
BY
ATTORNEY

Nov. 14, 1961  C. E. KRAUS  3,008,337
TOROIDAL TYPE TRANSMISSION
Filed Dec. 11, 1959  6 Sheets-Sheet 6

INVENTOR.
CHARLES E. KRAUS
BY
ATTORNEY

United States Patent Office 3,008,337
Patented Nov. 14, 1961

3,008,337
TOROIDAL TYPE TRANSMISSION
Charles E. Kraus, 238 Arbor Road, Franklin Lakes, N.J., assignor of small percentages to various assignees
Filed Dec. 11, 1959, Ser. No. 858,914
20 Claims. (Cl. 74—200)

This invention relates to variable speed-ratio transmissions of the traction drive type and is particularly directed to such transmissions of the type comprising a pair of drive members having facing toroidal surfaces with rollers disposed between and in friction driving contact with said surfaces and with each of the rollers being mounted for pivotal movement or precession of its axis of rotation to change the speed ratio of the driving connection between said members.

Such toroidal transmissions are disclosed in applicant's prior Patents 2,850,910 and 2,850,911 and it is an object of this invention to provide a novel and improved toroidal transmission.

As disclosed in said prior patents each roller is mounted for independent tilting movement about an axis parallel to but spaced from a line through the points of contact of the roller with each toroidal surface whereby the tangential traction forces on each roller at said points of contact exert a turning moment on each roller about said tilt axis. In addition, each roller is provided with a spring which exerts a force opposing the turning moment of said tangential forces whereby each roller, automatically and independently of the other rollers, travels or precesses across its toric surfaces to a speed ratio position in which the turning moments exerted by said tangential and spring forces are in balance. This independent tilting movement of each roller serves to minimize differences in the contact loads on the rollers resulting from such factors as manufacturing inaccuracies, tolerances, misalignment, etc.

An object of the present invention comprises the provision of hydraulic means exerting a turning moment force on each roller balancing the turning moment exerted by the tangential traction forces of the toric surfaces on each roller about the tilt axis of said roller such that each roller, automatically and independently of the other rollers precesses across its toric surfaces to a speed ratio position in which said turning moments are in balance. A further object resides in the provision of means for damping the roller tilting movements. This latter feature is important where the transmission is subject to fluctuating torque loads, for example, as in the case of automotive transmissions. In accordance with a still further object of the invention said roller damping means is hydraulic and may form part of said hydraulic balancing means for each roller.

Instead of tilting each roller about an axis parallel to a line through its points of contact with the roller toroidal surfaces in order to cause speed-ratio-changing precession or travel of the roller across the toric surfaces, another feature of the invention comprises the provision of means to cause such roller precession by independently shifting each roller along a linear path tangent to the centerline of the toric surfaces. Accordingly, it is also an object of the invention to provide a roller support in which each roller, automatically and independently of the other rollers, is movable along a linear path generally parallel to a tangent to the center line of the toric surfaces at a point adjacent to said roller, in response to changes in the tangential traction forces on each roller at the toric surfaces, for causing said roller speed-ratio-changing travel. With this latter arrangement each roller is urged along said linear path by a hydraulic force against said tangential traction forces such that each roller, automatically and independently of the other rollers, precesses across its toric surfaces, to a speed ratio position in which said forces are in balance. A further object of the invention resides in the provision of means for damping said linear roller movements for example by making said damping means part of said hydraulic force balancing means.

It is another object of the invention to provide a novel arrangement for minimizing differences in the contact pressures on the two points of contact of each roller with the toroidal surfaces. In the absence of such an arrangement excessive contact forces would be required to avoid slipping at the more lightly loaded of the roller contacts with the two toroidal surfaces. In accordance with the invention each roller is mounted so as to have a freedom of movement between its two toroidal surfaces in a radial plane including the transmission axis so that each roller is free to move in said plane so as to minimize differences in its contact pressures with its two toroidal surfaces.

With each roller free to tilt or move linearly to cause said roller to precess to a speed-ratio position in which the roller tilt or linear movement forces on each roller are in balance, it is necessary to provide stop means to limit the speed-ratio-changing travel of each roller. It is another feature of the invention to provide a novel stop arrangement for limiting speed-ratio-changing travel of each roller in one direction such that engagement of the roller with the stop serves to tilt or linearly move the roller in a direction tending to reverse the speed-ratio-changing travel of the roller. A similar stop is provided for the other limiting speed-ratio position of each roller.

Another feature of the invention resides in the provision of means for causing the axial loading of the traction rollers between the toroidal discs to increase quickly upon any increase in torque load but to decrease relatively slowly upon any decrease in said torque load.

Still another feature of the invention resides in the provision of means for varying the magnitude of the hydraulic force on each roller opposing the tangential traction forces on said roller for automatically causing a speed-ratio-changing precession of the rollers.

Other objects of the invention will become apparent upon reading the annexed detailed description along with the drawing in which.

Referring first to FIGS. 1–7 of the drawing, the transmission embodying the invention comprises a pair of co-axial disc members 10 and 12 having facing and co-axial toroidal surfaces 14 and 16, respectively, said toroidal surfaces having a substantially common circular centerline indicated at 18. A plurality of circumferentially-spaced rollers 20 are mounted between and disposed in rolling contact with the surfaces 14 and 16 for providing a frictional drive connection therebetween.

Figure 1:
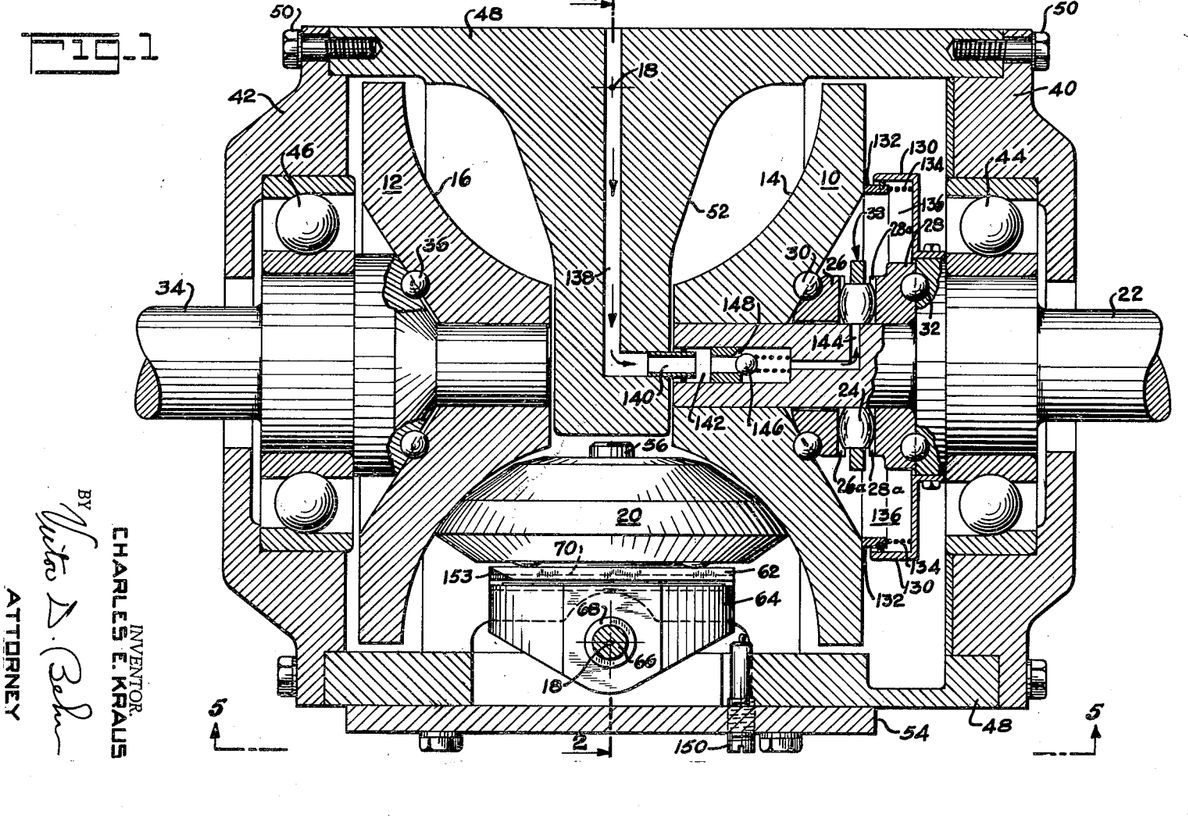
FIG. 1 is an axial sectional view through a transmission embodying the invention.
Figure 2:
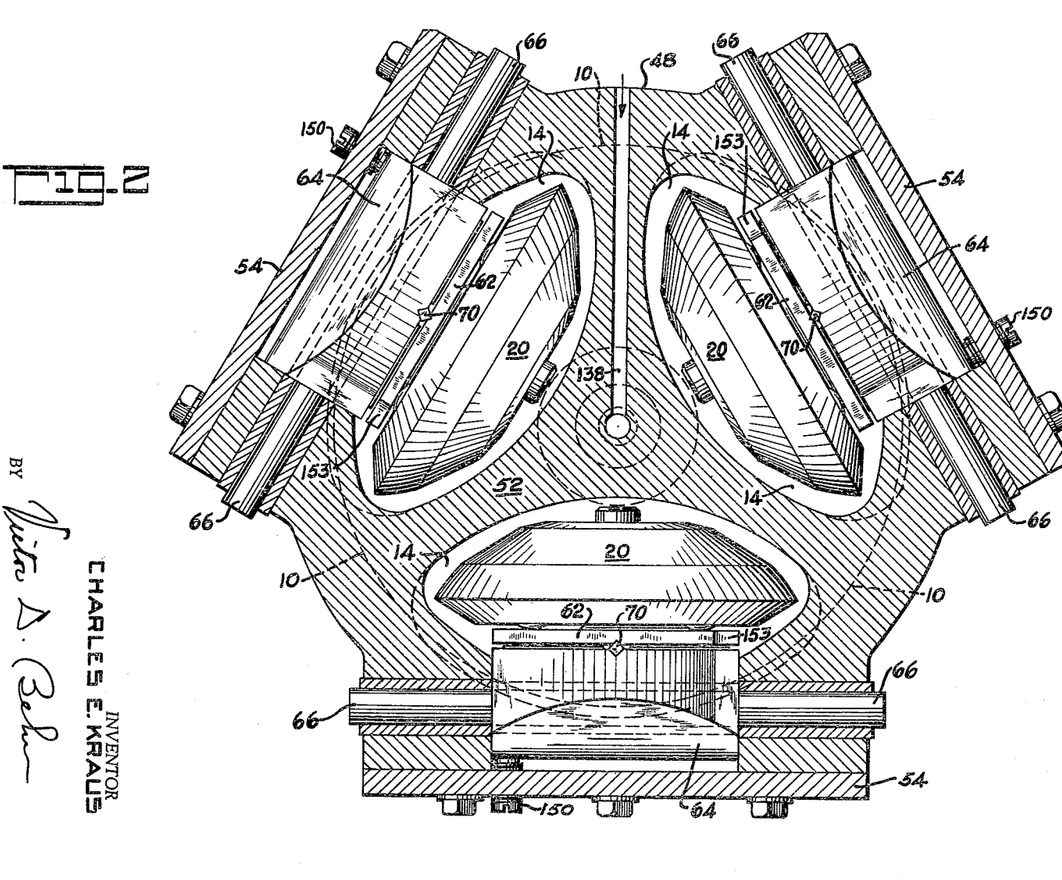
FIG. 2 is a sectional view taken along line 2—2 of FIG. 1, but showing the rollers and their supporting structure in elevation.

The toroidal disc member 10 is mounted on the transmission input shaft 22 and is connected to said shaft through circumferentially-spaced rollers or sprags 24 disposed between ring members 26 and 28 which are keyed at 30 and 32 to said disc member 10 and shaft 22 respectively for joint rotation therewith. The keys 30 and 32 are spherical balls received in spherical pockets in the adjacent members to provide a driving connection therebetween. The toroidal disc member 12 is mounted on the transmission output shaft 34 and is keyed at 36 to said shaft for joint rotation therewith, the shafts 22 and 34 being co-axial.

The facing surfaces of the rings 26 and 28 have cam formations 26a and 28a between which the sprags 24 are disposed. Said cam surfaces are such that any increase in the torque load transmitted results in a small relative rotation of the cam rings 26 and 28 to increase the axial loading of the toroidal disc 12 toward the disc 10 thereby increasing the contact pressure between the toroidal surfaces 14 and 16 and the friction drive rollers 20. Likewise any decrease in said torque load results in a corresponding decrease in the axial loading of the toroidal discs 10 and 12 against the rollers 20. This axial loading device comprising the sprags 24 and cam rings 26 and 28 is designated by reference numeral 38.

The provision of such a cam and sprag device 38 is well known in toroidal-type transmissions for automatically increasing and decreasing the axial loading of the toroidal discs 10 and 12 against the rollers 20 with increase and decrease, respectively, in the torque load. The provision of such a sprag and cam device 38 is required primarily on the side of the transmission imposing substantial torsional shocks on the transmission. In the case of a transmission for an internal-combustion-engine driven automotive vehicle, the axial loading device 38 is disposed, as illustrated, on the input side of the transmission because of the substantial torsional vibrations of such an engine. With this arrangement, any torsional shock (sudden torque increase) imposed by the input shaft 22 increases the contact pressure on the traction drive rollers 20 before the traction force on said rollers is increased by the shock, said traction force being delayed by inertia and the relative rotation of cam rings 26 and 28 as the axial loading is being increased.

In the case of an automotive transmission the torsional shocks imposed on the transmission by the output side of the transmission do not appear to require a second set of said cam rings and sprags between the output shaft and the toroidal disc 12 for changing the axial loading of the traction drive rollers 20 between the discs 10 and 12 in response to said latter torsional shocks. However, with the arrangement illustrated, if the output shaft 34 did impose substantial torsional shocks on the transmission, then such a torsional shock would increase the traction force on the drive rollers 20 before the axial loading device 38 could produce the desired increase in the axial loading of the toroidal disc surfaces 14 and 16 against the rollers 20. In such case a second set of axial loading sprags would also be provided on the output side of the transmission between the shaft 34 and disc 12.

The toroidal disc members 10 and 12 of the transmission and the interposed friction or traction drive rollers 20 are mounted within a fixed housing comprising end members 40 and 42 carrying bearings 44 and 46 for the shafts 22 and 34 respectively. The transmission housing also includes an intermediate member 48 secured to the end members 40 and 42 as by screws 50 and having a Y-shaped (as viewed in FIG. 2) frame structure 52 disposed between the rollers 20. The intermediate housing member 48 has an opening over each roller with each said opening being closed by a cover 54.

Figure 3:
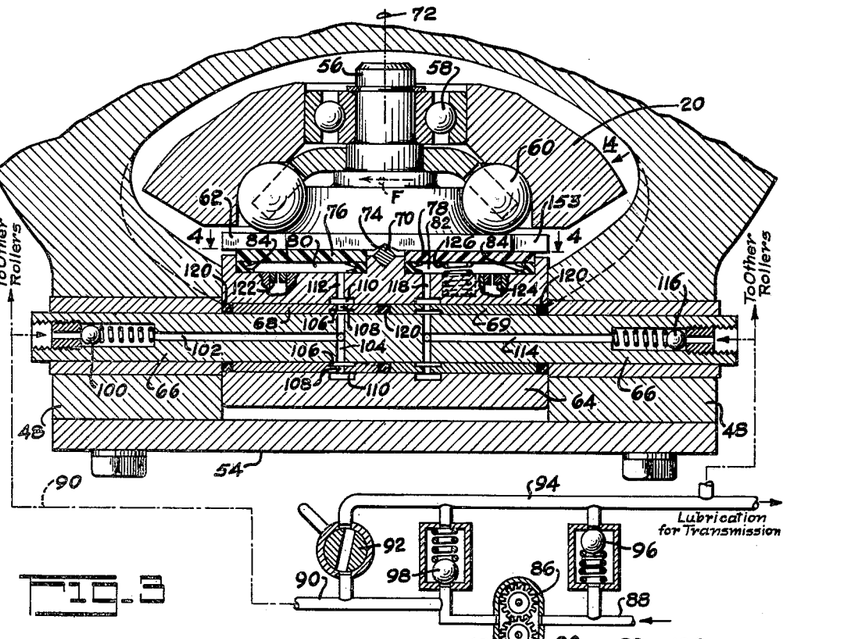
FIG. 3 is an enlarged sectional view of one roller and its support and also taken along line 2—2 of FIG. 1.

The details of each roller and its support and control structure are best seen in FIG. 3. Each roller 20 is journaled on a stub shaft 56 by bearings 58 and 60, said shaft having an end plate 62. Each roller 20 is pivotally supported in position between the toroidal surfaces 14 and 16 by a support block 64. Each block 64 is pivotally mounted on a hollow pin 66 extending through sleeve-type bearings or bushings 68 and 69 fitted within a bore extending through said block, the projecting ends of said pin being carried by adjacent bosses on the intermediate housing structure 48. The axis of each pin 66 is tangent to the toroidal center circle 18 and is disposed in a plane perpendicular to the transmission axis. The pins 66 like the rollers 20 are equally spaced about the transmission axis. There is one pivot pin 66 and one supporting block 64 for each roller 20.

The surface of each supporting block 64 facing its roller 20 has a V-shaped rib 70 projecting therefrom with its apex running in a direction perpendicular to the axis 72 of its roller and to the direction of the axis of its associated pivot pin 66 whereby said apex lies in a plane including the transmission axis. The apex of each V-shaped rib 70 is received in V-shaped groove 74 in the end plate 62 of the stub shaft 56 on which its roller is journaled so that each block 64 holds its roller 20 in position between the toric members 10 and 12.

The apex angle of the V-shaped groove 74 of each roller is greater than the apex angle of the associated rib 70 so that each roller can rock or tilt about the apex of its rib 70 as an axis.

The apex of each rib 70 is disposed parallel to and is spaced somewhat radially outwardly of a line through the points of contact of its associated roller 20 with the toric surfaces 14 and 16 whereby, as hereinafter described, the tangential traction forces F (one of which is shown in FIG. 3) of the toric surfaces on each roller exert a turning moment on the roller tending to tilt the roller about the apex of its associated rib 70.

Each roller support block 64 has a pair of piston members 76 and 78 disposed on opposite sides of the rib 70 of said block and engageable with the end plate 62 of the adjacent roller stub shaft 56. The piston members 76 and 78 are slidably received within recesses or piston cylinders 80 and 82 respectively in the surface of its block 64 facing the associated roller 20 so as to engage the end plate 62 of the stub shaft 56 for said roller. As illustrated, the piston members 76 and 78 are made of a plastic material which may be nylon. Obviously, however, said piston members may be made of any suitable material.

As illustrated in FIG. 3 means are provided for supplying a liquid (such as lubricating oil) under pressure to each of the piston cylinders 80 and 82 behind their respective pistons 76 and 78 for urging said pistons against the end plates 62 of their associated rollers 20. Seal members 84, preferably of rubber-like material, are disposed within and around the periphery of each piston cylinder 80 and 82 and under their respective pistons to prevent leakage of said liquid around the pistons.

A pump 86, preferably driven by the engine or input shaft 22, is provided for supplying a liquid under pressure to the piston cylinders 80 and 82 behind their pistons 76 and 78. The pump 86 receives liquid from an input or supply line 88 and delivers it to an output or high pressure line 90. A variable by-pass valve 92 is effective when open to by-pass liquid from the output side of the pump back to its input side through a low pressure line 94 and low pressure relief valve 96. The relief valve 96 is set for a relatively low pressure of, for example, 30 p.s.i. A second pressure relief valve 98 connects the output side of the pump 86 to the low pressure line 94. This second pressure relief valve 98 is set for a relatively high pressure of, for example, 300 p.s.i. The actual magnitude of the pressure in the high pressure line 90 depends on the position of the valve 92, the setting of the pressure relief valve 98 determining only the maximum value of the pressure in the line 90. The pressure in the line 94 is constant and depends on the setting of the low pressure relief valve 96.

The high pressure line 90 is connected through a check valve 100 to a passage 102 passing through one end of each roller pivot pin 66. Each pivot pin passage 102 ends in radial passages 104 which communicate with an annulus 106 in the adjacent bushing 68, said bushing having radial holes 108 connecting the annulus 106 with an annulus 110 in the associated block 64. A passage 112 in each block 64 connects its annulus 110 with its piston cylinder 80 and piston 76. Similarly, the low pressure line 94 is connected to each piston cylinder 82 and piston 78 via a passage 114 and check valve 116 in the other end of each pivot pin 66 and transfer passages in bushing 69 and passage 118 in the associated support body 64. Also, suitable seals 120 are provided at the ends of the bushings 68 and 69.

Each piston cylinder 80 has a restricted vent passage 122 and each piston cylinder 82 has a restricted vent passage 124, said vent passages opening through their blocks 64 into the space between the toroidal discs 10 and 12. Also each of the low pressure piston cylinders 82 is provided with a pair of light compression springs 126 urging its piston 78 against the associated roller end plate 62. In addition oil supplied to the low pressure line 94 may, as indicated in FIG. 3, also be used for lubrication of the transmission.

The tangential traction force on a roller 20 exerted by the toroidal surface 14 of the input disc 10 at its point of contact with said roller is indicated at F in FIG. 3, clockwise rotation of said toroidal surface 14 and its input shaft 22 being assumed as indicated by the arrow in FIG. 3. The toroidal surface 16 of the output disc 12 exerts a similarly directed force on said roller 20 parallel to the force F but on the diametrically opposite side of said roller. These two parallel traction forces on each roller 20 exert a turning moment on the roller tending to tilt said roller about the apex of its V-shaped supporting rib 70, said turning moment being counterclockwise as viewed in FIG. 3.

Each pair of pistons 76 and 78 also exert a turning moment on their associated roller 20 tending to tilt said roller about the apex of its supporting rib 70. The cylinder 82 for each piston 78 is connected to the constant low pressure line 94. Accordingly, each piston 78 exerts a substantially constant tilting turning moment on its roller because the fluid pressure force behind said piston and the force of the springs 126 on said piston are substantially constant. The cylinder 80 for each piston 76 is connected to the high pressure line 90. The pressure in this line is adjustable, however, and is under the control of the valve 92 whereby the force exerted by each piston 76 on its roller is variable and is under control of said valve 92. Thus a closing or opening adjustment of the valve 92 effects an increase or decrease respectively in the pressure behind the pistons 76. During normal operation each piston 76 exerts a greater force on its roller end plate 62 than does the associated piston 78 such that the tilting turning moment exerted by each pair of pistons 76 and 78 on a roller 20 about the apex of its V-shaped supporting rib 70 is clockwise as viewed in FIG. 3 and opposes and normally balances the counterclockwise turning moment exerted by the traction forces F exerted on said roller by the torodial surfaces 14 and 16.

Because the two torodial discs 10 and 12 rotate in opposite directions any tilting of a roller 20 about the apex of its supporting rib 70 causes the roller to precess about its pivot pin 66 to change its speed-ratio position. For example, if the valve 92 is given a closing adjustment, the pressure exerted by each piston 76 will increase so as to tilt its roller clockwise (as viewed in FIG. 3) about its supporting rib 70. This tilting will cause each roller to precess about its pivot pin 66 to increase the speed of the output disc 12, that is the point of contact of each roller 20 moves radially inwardly on the output disc surface 16 and radially outwardly on the input disc surface 14. By itself this speed-ratio-change movement of each roller in a direction for increasing output speed results in an increase in the torodial disc traction forces on the roller so that said movement of each roller continues until the turning moments about its supporting rib 70 are again in balance.

Likewise an opening adjustment of the valve 92 results in a decrease in the pressure exerted by each piston 76 whereupon each roller tilts counterclockwise (as viewed in FIG. 3) about its supporting rib 70. This counterclockwise tilting causes each roller to precess in a direction to decrease the speed of the output disc 12. That is the point of contact of each roller 20 now moves radially outwardly on the output disc surface 16 and radially inwardly on the input disc surface 14. This speed-ratio changing precession of each roller 20 results in a decrease in the toroidal disc traction forces on each roller so that said precession continues until said tilting moments on each roller 20 about its supporting rib 70 are again in balance. Each roller 20 thereby and automatically assumes a speed-ratio position, independently of the other rollers, in which said tilting turning moments are in balance. The springs 126 provide a constant biasing force tending to tilt each roller in a direction for speed-ratio changing precession of each roller toward its position for low output speed.

This independent tilting movement of the rollers assures each roller precessing to a speed-ratio position in which the forces on the roller are in balance whereby, as already noted, differences in the loads transmitted by the rollers, resulting from such factors as manufacturing inaccuracies, tolerances, misalignment, etc., are minimized.

It should be noted that the provision of the bleed openings 122 and 124 serves to make the hydraulic pressure force behind each piston 76 and 78 yieldable in response to unbalance of the turning moments on their associated roller 20 about its support rib 70.

In all speed-ratio positions of a roller 20, its support rib 70 lies in a plane including the transmission axis and is perpendicular to the axis of the roller 20 and to the axis of the pin 66 and said rib forms a guideway along which its roller 20 is free to shift to equalize the contact loads at the two toroidal surfaces 14 and 16. This minimizes the axial loading required of the toroidal discs 10 and 12 toward each other to insure adequate contact pressure at both points of contact of each roller 20 with said two toroidal discs. In the absence of any provision for such shifting freedom of each roller 20 between the toroidal discs 10 and 12 in a plane including the transmission axis, the contact pressure of a roller 20 against one disc may be greater than against the other because of manufacturing tolerances, errors, etc. In such a situation excessively high axial loading of the two discs would be required to avoid slipping of the roller at the disc having the lower contact pressure with the roller.

The arrangement illustrated, in which each roller 20 is disposed radially inwardly of the toric centerline 18, further minimizes the required axial loading of the rollers 20 between the toroidal discs 10 and 12 as compared to the usual prior arrangement in which each roller is disposed on the toric centerline 18. The sprag and cam device 38 axially loads the rollers 20 between the toroidal discs 10 and 12 in proportion to the torque input. The actual contact force between the input toroidal surface 14 and a roller 20 is equal to the product of said axial force on the roller with the reciprocal of the cosine of the angle between the transmission axis and the normal to said toric surface at its point of contact with the roller.

This angle obviously changes as the speed-ratio position of the roller changes and therefore the actual contact pressure likewise changes. If the rollers have the aforementioned prior art disposition on the toric centerline then for a constant torque input, if the contact force on a roller is sufficient to prevent roller slipping when its speed-ratio position is set for low output speed the contact force on the roller will become excessive when the roller is set at its high output speed position.

However, if the position of each roller is, as illustrated, disposed radially inwardly from the toric centerline 18, a curve of the actual contact force on a roller plotted against speed ratio position of the roller approaches the shape of the curve for the contact force required to prevent slipping at the various speed ratio positions. The rollers preferably are positioned radially inwardly of the toric centerline a distance approximately equal to one-half the radius of the surfaces 14 and 16 from the toric center 18. With this arrangement excessive roller contact pressure at high speed-ratio positions of the roller is avoided.

Means are also provided for damping tilting movements of each roller 20 about the apex of its supporting rib 70. The restricted vents 122 and 124 and check valves 100 and 116 provide for such damping. Thus any clockwise tilting of the roller 20 in FIG. 3 requires liquid to be forced out of the cylinder 82 through the restricted vent 124, the check valve 116 preventing liquid from being forced back into the line 94 from said cylinder. Similarly, the vent 122 and check valve 100 restrain counterclockwise tilting rotation of said roller. It is apparent therefore that the restrictions 122 and 124 and check valves 100 and 116 serve to dampen or retard tilting movements of the rollers 20.

The provision of such means for damping tilting movements of the rollers 20 is particularly important where the transmission is used with apparatus having a pulsat- input or output torque. Any such torque pulsation produces a change in the traction forces on each roller thereby producing an unbalance of the turning moments tending to tilt the roller about the apex of its supporting rib 70. Accordingly, in the absence of said roller tilt damping means, such torque pulsations would cause corresponding speed-ratio-changing oscillations of the rollers. Obviously, if the frequency of any such roller oscillation happened to coincide with the natural frequency of vibration of a part of the transmission destructive vibrations might result.

The problem of speed-ratio-changing oscillations of the rollers 20 is aggravated by the fact that when a roller tilts about the apex of its supporting rib the resulting speed-ratio-changing precession of the roller is in the same direction as the gyroscopic force on the roller tends to cause the roller to swing. If the rate of roller tilting is fast said gyroscopic force will be large and the roller will tend to overshoot the position at which its tilting turning moments are in balance and therefore the roller will tend to hunt about said position. If the rate of roller tilting is damped, however, said gyroscopic force can be made so small as to be negligible.

As already stated the sprag and cam device 38 is on the side of the transmission subject to fluctuating torque loads. In the case of an automotive transmission and as illustrated the device 38 is on the engine side of the transmission and therefore causes the axial loading of the rollers 20 between the toroidal discs to follow changes in the input torque. Means may be provided for damping fluctuations of the axial loading of the rollers. Said damping means preferably is such that the axial loading increases promptly with increase in torque but falls off slowly when the torque decreases. For this purpose, and as illustrated in FIG. 1, a cylindrical sleeve 130 surrounds the sprag and cam mechanism 38, said sleeve being secured to the input shaft 22. This sleeve extends toward the toroidal disc 10 and a slidable seal ring 132 is fitted within said sleeve. A spring 134 urges the ring into sealing contact with the back of the toroidal disc 10. The space 136 enclosed by the sleeve 130 and seal ring is supplied with liquid, for example, lubricating oil. This liquid is supplied through a supply line 138 in the housing structure 48, said line ending in a tubular fitting 140 extending into a bore 142 within the shaft 22. The shaft bore 142 ends in a radial passage 144 which communicates with the space 136. A check valve 146 is disposed within the shaft bore 142, said check valve permitting liquid to be supplied to the space 136 but preventing outflow except through a restriction 148.

With this latter construction the sprag and cam device 38 and space 136 surrounding said device is filled with liquid which is supplied through the check valve 146 and can only escape through the restriction 148. Upon an increase input torque there is a slight rotation of the cam 28 relative to the cam 26 to increase the axial pressure on the cam 26 whereby the volume of the space 136 increases slightly. The check valve 146 permits liquid to immediately enter the space 136 to keep it full. When the input torque decreases the space 136 tends to decrease in volume. However, the only way liquid can leave the space 136 is through the restriction 148 so that the axial loading of the toroidal discs falls off much more slowly than the torque but upon a torque increase the axial loading of the toroidal discs immediately increases in proportion to said torque increase.

If a similar axial loading device such as 38 were provided on the output side of the transmission in addition to or in lieu of the device 38 on the input side, such output axial loading device preferably would also be provided with means for retarding the decrease in the axial loading upon a decrease in torque.

Since each roller 20 automatically takes a speed-ratio-position in which the turning moments about its tilt axis are in balance it is necessary to provide means to limit the two extreme speed-ratio-changing positions of each roller. For this purpose, a pair of stop screws 150 and 152 are provided on each housing cover for engagement with diametrically-opposite beveled corners 151 and 153 respectively of the end plate 62 on the adjacent roller stub shaft 56. At this point it should be noted that each roller end plate has a square shape.

Figures 5, 6, 7:
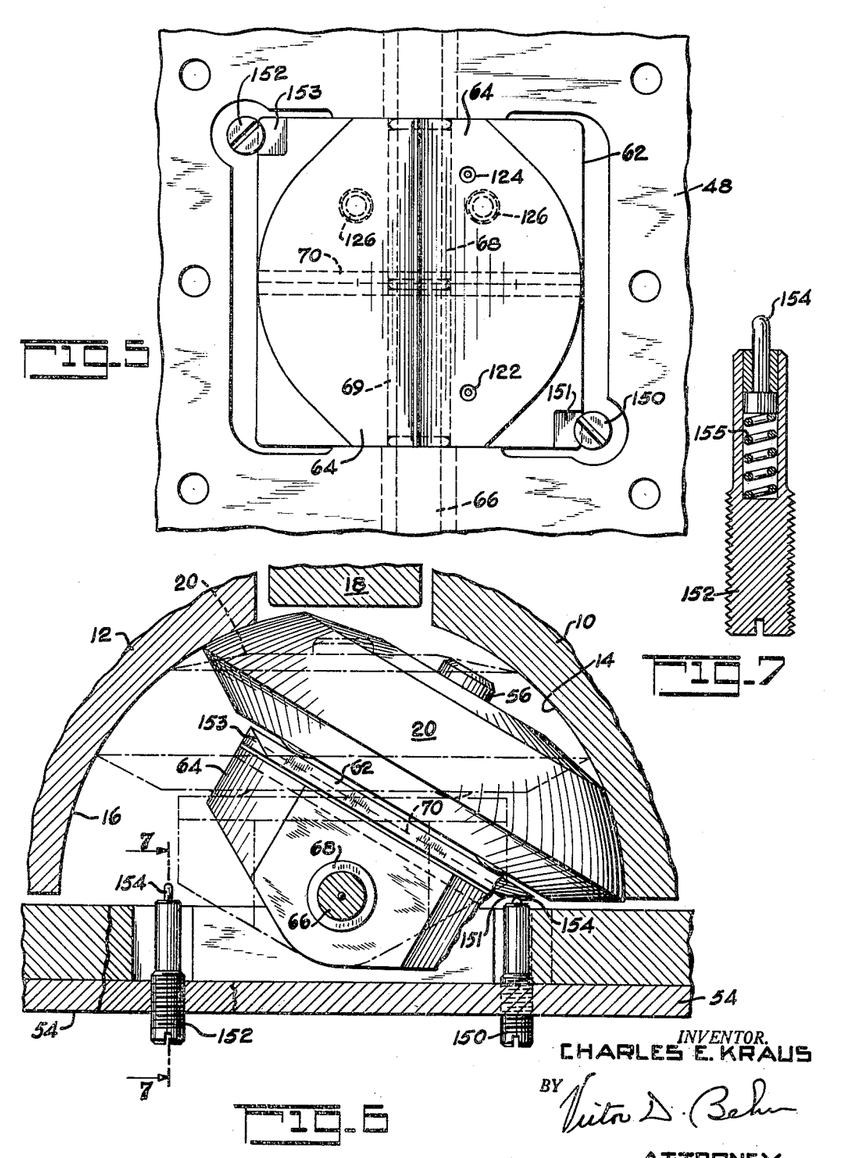
FIG. 5 is a view taken along line 5—5 of FIG. 1 but with the cover removed.
FIG. 6 is a view of the roller portion of FIG. 1 but showing the roller in one extreme speed-ratio-position.
FIG. 7 is an enlarged sectional view of one of the stops taken along line 7—7 of FIG. 6.

When a roller 20 travels to its extreme high output speed position (FIG. 6) the roller plate 62 engages a stop screw 150. If the roller tends to precess further in the high output speed direction the pin 150 will cause the roller to tilt about the apex of its supporting rib 70 in a direction to cause the roller to precess in the reverse speed-ratio-changing direction. Similarly each stop 152 limits speed-ratio-changing precession of the associated roller in its low output speed direction. Each of the stops 150 and 152 has a screw thread adjustment so that the limiting positions of each roller can be individually set. Also, as best seen in FIG. 7, each stop 150 and 152 has a yieldable spring pressed pin 154 projecting from its end and urged outwardly by a spring 155. The purpose of the spring pressed pins 154 is to accommodate differences in the settings of the stops for the individual rollers. For example, if one roller 20 engages its stop 150 or 152 before the other rollers the contact pressure between said roller and stop might become excessive but for the yieldable pin 154.

If the direction of rotation of the transmission input shaft 22 is reversed, so as to be counterclockwise rather than clockwise as viewed in FIG. 3, the direction of the two tangential traction forces F on each roller 20 would likewise be reversed. Accordingly, if the transmission input shaft were connected to an engine or other source of power whose direction of rotation were reversible then means would have to be provided to reverse the hydraulic pressure and spring forces on the pistons 76 and 78. In addition, a second pair of stops for limiting the speedratio-changing travel of each roller, the one pair, 150 and 152, having their pins 154 engageable as illustrated with one pair of opposite corners of the plate 62 for said roller while for reverse rotation the corresponding pins of a second pair of stops would be engageable with diametrically opposite corners of said plate. Such a modification of the transmission to accommodate a reversible input shaft is schematically illustrated in FIG. 3A.

Figure 3A:
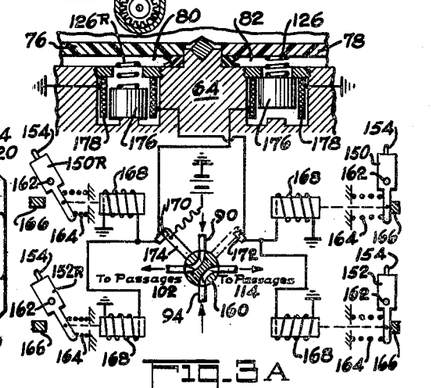
FIG. 3A is a partial view showing a modification to accommodate reverse rotation of the transmission input shaft.
Figure 4:
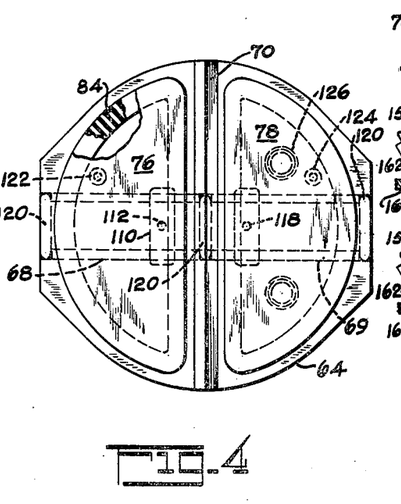
FIG. 4 is view taken along line 4—4 of FIG. 3.

As shown in FIG. 3A, the high and low pressure lines 90 and 94 respectively are connected to the pivot pin passages 102 and 114 for the piston cylinders 80 and 82 of the rollers via a reversing valve 160 such that with said valve in its full line position said hydraulic connections are like those of FIG. 3. Two pairs of stops are provided for each roller 20, the one pair 150 and 152 being those already described and the other pair 150R and 152R being for reverse rotation of the input shaft 22. In FIG. 3A each of said stops instead of being rigidly supported is pivotally supported at 162 and a spring 164 urges its stop to its operative position against an abutment 166. Each said stop also has a solenoid 168 connected to it for pivotally swinging the stop to an inoperative position when the solenoid is energized.

The solenoids 168 for the stops 150R and 152R are connected to a contact 170 while the solenoids 168 for the stops 150 and 152 are connected to a contact 172 said contacts being arranged to be electrically engaged by the handle 174 of the reversing valve 160 at the two extreme positions of said handle. The contact 170 is arranged to be engaged by the handle 174 of the reversing valve 160 when said valve is in its full line position as illustrated. In this position of the valve 160 a circuit is completed for the solenoids 168 of the stops 150R and 152R whereupon said stops are swung out of the way to inoperative positions. At this valve position the contact 172 is not engaged by the handle 174 so that the solenoids 168 for the stops 150 and 152 are de-energized and the springs 164 are effective to hold these stops in their operative positions.

A second set of biasing springs 126R corresponding to the springs 126 for the pistons 78 preferably is provided for the piston 76 of each roller 20 so as to be effective when the direction of input shaft rotation is reversed. In FIG. 3A each spring 126 and 126R is arranged to be held against its piston 78 and 76 respectively by a solenoid plunger 176 when its solenoid winding 178 is energized. The solenoid winding 178 for each spring 126 is connected to the contact 170 while the winding 178 for each spring 126R is connected to the contact 172. Accordingly, with the valve 160 in its full line position illustrated the solenoid windings 178 for the springs 126 are energized to hold the plungers 176 for the springs 126 in their raised positions whereupon said springs are effective, as in FIG. 3, to exert a small biasing force against their pistons 78. At the same time the solenoid windings 178 for the springs 126R are de-energized whereupon each spring 126R is ineffective.

It is apparent that with the valve 160 in its full line position the hydraulic and spring forces on the pistons 76 and 78 and the stops 150 and 152 function as previously described in connection with FIG. 3.

When the direction of the input shaft 22 is reversed the handle 174 of the reversing valve 160 is moved to its dot and dash line position. In this reversed position of the valve 160 the hydraulic connections to the piston cylinders 80 and 82 of each roller are reversed. In addition, the electric circuit is now broken at contact 170 and made at contact 172. Accordingly, the solenoids 168 for the stops 150R and 152R are now de-energized so that their springs 164 are effective to swing the stops 150R and 152R to their operative positions for limiting the speed-ratio-changing precession of the rollers 20. Similarly the solenoids 168 for the stops 150 and 152 are now energized thereby swinging said stops to their inoperative positions. In addition, when the circuit is broken at contact 170 and made at 172 the solenoid windings 178 for the springs 126 are de-energized and the solenoid windings for the springs 126R are energized whereby the springs 126 are no longer effective but the springs 126R now exert a light biasing force against their piston 76. Thus in addition to reversing the hydraulic connections, the stops 150R and 152R and springs 126R are now effective while the stops 150 and 152 and springs 126 are ineffective.

As illustrated the transmission of FIGS. 1–7 has three circumferentially-spaced rollers 20. Obviously, however, any number of such rollers could be provided in this transmission as well as in the transmissions of FIGS. 8–9 and FIGS. 10–12 hereinafter described. Also, as illustrated, only one roller 20 is supported from each pivot pin 66. As shown in applicant's prior Patent 2,850,911 a plurality of rollers may be nested together for support from a single speed-ratio-changing pivot.

Figure 8:
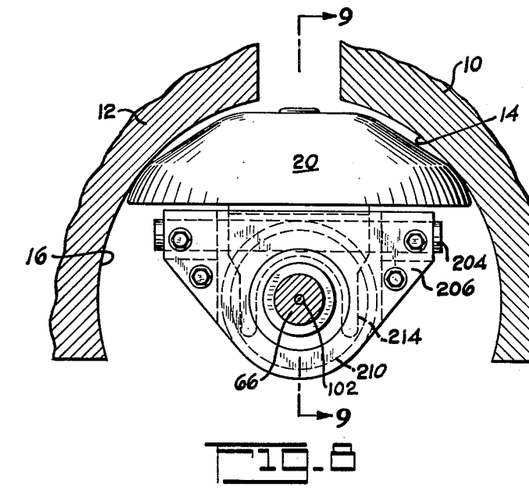
FIG. 8 is a partial view similar to FIG. 1 but showing a modified construction.
Figure 9:
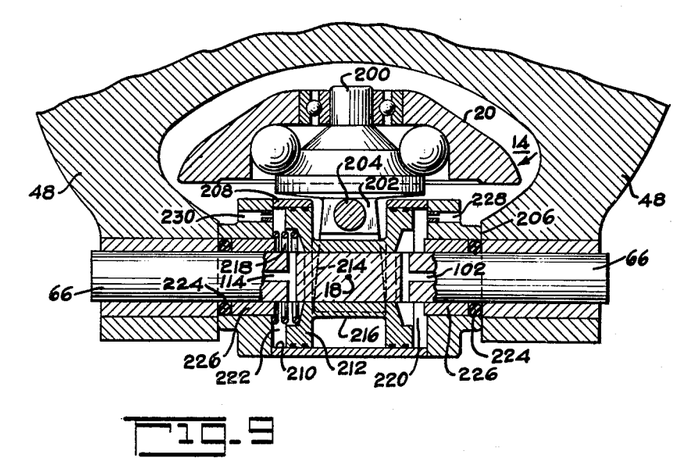
FIG. 9 is a sectional view taken along line 9—9 of FIG. 8.

In lieu of a V-shaped apex, such as provided by the rib 70 for providing tilting and sliding movements of each roller, a pivot pin may be provided for this purpose. Such an arrangement is illustrated in FIGS. 8–9. The transmission of FIGS. 8–9 is like that of FIGS. 1–7 except for details of the support for each roller and therefore except for such details the same reference numerals are used in FIGS. 8–9 as in FIGS. 1–7.

In the transmission of FIGS. 8–9 each roller 20 is journaled on a stub shaft 200, each such shaft having a portion 202 projecting radially outwardly from its rollers 20. A pivot pin 204 is carried by the shaft portion 202, the axis of said pin being parallel to but disposed somewhat radially outwardly of a line through the points of contact of its roller 20 with the two toric surfaces. The outer ends of each pin 204 are journalled in a multi-part support block 206 and suitable clearance is provided between said block and roller shaft portion 202 to permit the roller and its pin 204 to slide along the axis of said pin relative to the support block. The support block 206 in turn is mounted on a pivot pin 66 for speed-ratio-changing movement of its roller 20 about the axis of said latter pin. As previously stated the axis of each pin 66 is tangent to the toroidal centerline 18 and is disposed in a plane perpendicular to the transmission axis.

Each support block has a hollow intermediate part 208 having a cylindrical space 210 within which a piston member 212 is slidable along the pivot pin 66 extending through said block. The intermediate block part 208 has an opening on the side adjacent to its roller 20 through which extend the shaft projection 202 and forked arms 214 on the end of said projection. The forked arms 214 straddle a reduced diameter mid portion 216 of the piston 212 so that motion of the piston along the pivot pin 66 is effective through said arms to cause a tilting movement of its roller 20 about the axis of the pin 204.

A spring 218 acts on one side of each piston 212 to urge its roller to tilt in a counterclockwise direction about the axis of the pin 204. These springs 218 of the roller supports in FIGS. 8–9 are equivalent to the springs 126 in FIGS. 1–7. A liquid under relatively low pressure is supplied to the chamber 222 on one side piston 212 through the passage 114 in the pivot pin 66 and a liquid under relatively high but adjustable pressure is supplied to the chamber 220 on the other side of each piston 212 through the passage 102 in the pivot pin 66. Suitable seals 224 and bearings 226 are provided between each pivot pin 66 and its associated roller supporting block 206. Also, as in FIGS. 1–7 restricted bleed openings 228 and 230 are provided for the piston cylinders 220 and 222 respectively.

As in the case of the embodiment of FIGS. 1–7, during normal operation of FIGS. 8–9 said adjustable high pressure force on the piston 212 is sufficient to overcome the opposing low pressure force on said piston and that of the spring 126. Therefore the fluid pressure forces on each piston 212 together with the force of its spring 218 normally provide a clockwise turning moment (as viewed in FIG. 9) on each roller 20 about the axis of its pin 204 while the traction forces on said roller provide a counterclockwise roller turning moment about said axis, clockwise rotation (FIG. 9) of the toric surface 14 being assumed as in FIG. 3. Also each roller 20 is free to slide along the axis of its tilt pin 204 between the toroidal discs 10 and 12.

It should be apparent, therefore, that the speed-ratio-changing operation of each roller 20 in FIGS. 8–9 is essentially the same as in FIGS. 1–7. Also the shifting freedom of each roller 20 along the axis of its tilt pin 204 serves to equalize the contact pressures of each roller on the two toroidal discs 10 and 12 in the same way as is obtained in FIGS. 1–7 by the shifting freedom of each roller 20 along its supporting rib 70.

Figure 10:
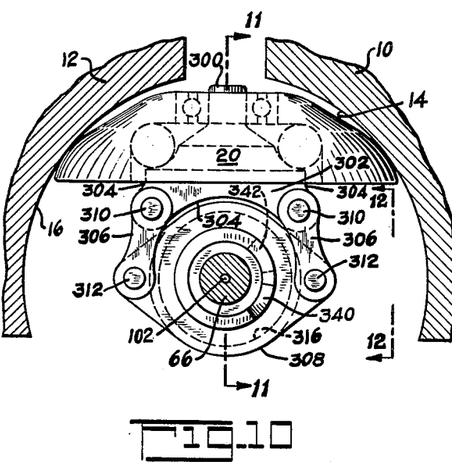
FIG. 10 is another partial view similar to FIG. 1 but showing another modification.
Figure 11:
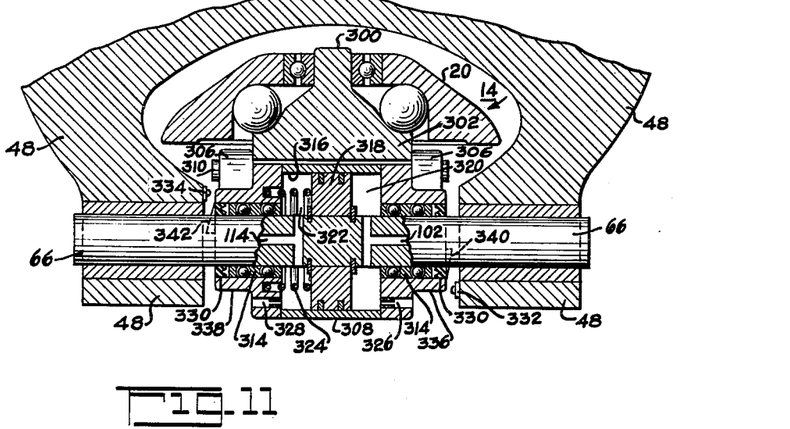
FIG. 11 is a sectional view taken along line 11—11 of FIG. 10.
Figure 12:
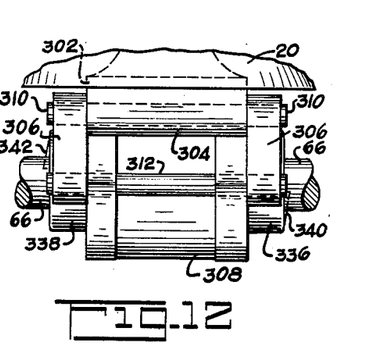
FIG. 12 is a side view taken along line 12—12 of FIG. 10.

In FIGS. 1–7 and in FIGS. 8–9 speed-ratio-changing precession movement of each roller 20 is obtained by causing each roller to tilt about an axis which is disposed parallel to but somewhat radially outwardly of a line through the points of the roller with the two toric surfaces. Such precession movement of the rollers can also be obtained by sliding each roller along a line tangent to the toric centerline as is illustrated in FIGS. 10–12. Except for details of the support for each roller the transmission of FIGS. 10–12 is like that of FIGS. 1–7 and except for such details the same reference numerals have been used in FIGS. 10–12.

In FIGS. 10–12 each roler 20 is journaled on a stub shaft 300 which has an end plate 302 on its radially outer end relative to the transmission axis. The end plate 302 of each roller shaft has a pair of ears 304 on diametrically opposite sides of said plate, each of said ears being pivotally connected by a pair of links 306 to the supporting block 308 for the roller.

Each roller supporting block 308 is journaled on a pivot pin 66 for speed-ratio-changing movement of its roller about an axis of said pin. As in the other modifications, the axis of each pivot pin 66 is tangent to the toric centerline 18 and lies in a plane transverse to the transmission axis. Pins 310 and 312 pivotally connect the ends of each link 306 to the associated roller end plate 302 and supporting block 308 respectively and said pins are both parallel to the supporting block pivot 66.

The links 306 provide for shifting freedom of each roller between the toroidal discs 10 and 12 so as to equalize the contact loads of each roller 20 on the two toroidal surfaces 14 and 16 of said discs. Thus the roller shifting provided by the links 306 is equivalent to the shifting freedom of each roller along its guideway 70 in FIGS. 1–7 and to the shifting freedom of each roller along the axis of its tilt pins 204 in FIGS. 8–9. Accordingly, in each of the modifications illustrated each roller 20 has a freedom of movement between the toroidal discs in a direction perpendicular to the roller axis and to the axis of its pivot pin 66 for equalizing the contact loads of each roller on the two toroidal surfaces 14 and 16.

Each roller support block 308 not only is pivotally movable about the axis of its pin 66 but also is axially movable therealong. Suitable roller bearings 314 are provided between each block 308 and pin 66 to permit said axial sliding movement along the pin 66 with a minimum of friction as well as to permit speed-ratio-pivotal movement of the roller about the axis of said pin.

Each support block 308 has a multi-part construction, the intermediate part of which has a cylindrical bore 316 within which a piston 318 is disposed. The piston 318 is fixed to the pivot pin 66 which in turn is fixed in the housing structure 48, said piston dividing the bore 316 into a pair of chambers 320 and 322.

A spring 324 is disposed in the chamber 322 between the piston 318 and one end of the support block for urging said block with its roller 20 axially to the left relative to the piston as viewed in FIG. 11. With the input toroidal disc surface 14 rotating clockwise, as viewed in FIG. 11, the traction forces on the roller 20 are to the left and linear motion of a roller 20 to the left results in the roller precessing about its pivot pin 66 in a direction to decrease the speed of the output disc surface 16. Each spring 324 also urges its roller 20 to the left as viewed in FIG. 11. It is apparent therefore that the spring 324 of FIGS. 10–12 is equivalent in function to the springs 126 and 218 of FIGS. 1–7 and FIGS. 8–9 respectively.

A liquid under a relatively low pressure is supplied to the piston chamber 322 through the passage 114 in the pivot pin 66 and a liquid under a relatively high but adjustable pressure is supplied to the piston chamber 320 through the passage 102 in the pivot pin 66. Also the piston chambers 320 and 322 are provided with restricted vent openings 326 and 328 respectively. Seals 330 are incorporated in the bearings 314 between the support block 308 and the pivot pin 66.

With clockwise rotation (FIG. 11) of the toroidal surface 14, the traction forces on the roller 20 in FIG. 11 are directed to the left and are opposed by the combination of the fluid pressure forces in chambers 320 and 322 and the force of the spring 324 on the support block 308 for said roller. Any increase in the pressure in the high pressure chamber 320 causes the support block 308 and its roller 20 to shift linearly along the pin 66 to the right, as viewed in FIG. 11, along its pivot pin 66. This motion of the roller 20 relative to the toroidal surfaces 14 and 16 causes the roller to precess about the axis of its pivot pin 66 in a direction to increase the speed of the output toroidal disc surface 16 until the forces on the roller are again in balance.

The speed-ratio-changing operation of the rollers 20 in FIGS. 10–12 therefore is also essentially the same as in FIGS. 1–7. The control of the fluid pressures to the two piston chambers 320 and 322 in FIGS. 10–12 as well as to the two piston chambers 220 and 222 of FIGS. 8–9 preferably is essentially the same as that illustrated in FIG. 3 for the chambers 80 and 82.

In FIGS. 8–9, as in FIGS. 1–7, speed ratio changing precession of each roller 20 is caused by tilting of the roller about an axis disposed adjacent and parallel to a line through the points of contact of the roller with the two toroidal surfaces 14 and 16. Accordingly, in FIGS. 8–9 stops similar to the stops 150 and 152 preferably are provided (although not shown) for limiting the speed-ratio-changing precession of the rollers.

In FIGS. 10–11, however, speed-ratio-changing precession of each roller is caused by a linear movement parallel to the axis of its pivot pins 66. Accordingly, roller tilting stops, disposed as 150 and 152 in FIGS. 1–7, could not be used in FIGS. 10–11. Instead a pair of stops or abutments 332 and 334 are provided on the bosses of the housing member 48 for each support block 308 so as to face the hubs 336 and 338 at the two ends of said support block. The end hubs 336 and 338 have cam formations 340 and 342 arranged to engage the abutments 332 and 334 respectively at the extreme speed-ratio-changing positions of their roller 20. Thus when, for example, a roller 20 precesses counter-clockwise (FIG. 10) and reaches its extreme low-output-speed position any further precession of the roller 20 in this direction results in the cam 342 sliding over the abutment 334 to cause the roller 20 to shift to the right (FIG. 11) thereby causing the roller 20 to precess in the reverse speed-ratio-changing direction. Similarly each abutment 332 and cooperating cam 340 limits speed-ratio-changing precession of its associated roller in its high-output-speed direction.

Each abutment 332 and 334 preferably has a spring pressed pin projecting therefrom similar to the pin 154 of the stops 150 and 152. Each such pin 154 of the stops 150 and 152 or of the stops 332 and 334 yields or moves inwardly when engaged by a roller reaching a limit of its precession. It is obvious that this yielding movement of a pin 154 could be used to move a valve to change the control pressure to its roller 20 so as to reverse the direction of its precession instead of accomplishing this result by tilting the roller as in FIGS. 1–7 and FIGS. 8–9 or by linearly moving the roller as in FIGS. 10–12.

As in FIG. 3A, a second pair of precession limiting stops or abutments and a hydraulic connection reversing valve would be provided in the modification of FIGS. 10–12 as well as in the modification of FIGS. 8–9 in the event the direction of rotation of the transmission input shaft were reversible.

In each of the modifications illustrated specific restricted vent openings have been provided for small leakage flow from each of the hydraulic pressure chambers in the supporting blocks for the rollers 20. Obviously, however, the bearings between each such supporting block and its pivot pin 66 may be constructed to provide for such leakage flow.

As in FIGS. 1–7, check valves (not shown) are provided in the hydraulic pressure supply lines 102 and 114 in the pivot pins 66 of FIGS. 8–9 and of FIGS. 10–12. Such check valves together with the restricted vent openings 228 and 230 in FIGS. 8–9 and openings 326 and 328 of FIGS. 10–12 serve to damp movements of each roller inducing speed-ratio-changing precession or travel of the rollers across the toroidal discs in a manner similar to the damping of roller tilting movements in FIGS. 1–7.

As described, the restricted vent openings (122 and 124 of FIG. 3, 228 and 230 of FIG. 9 and 326 and 328 of FIG. 11) for the two hydraulic pressure cylinders in the supporting block for each roller 20 provide for damping of the roller movements. Instead of said restricted vent openings for this purpose it is clear that such openings could be eliminated or closed and in lieu of such openings flow restrictions could be provided in each of the inflow passages 102 and 114 to said chambers. With this latter arrangement the check valves 100 and 116 would be dispensed with. Also instead of using the hydraulic circuit controlling precession movements of the rollers for damping roller movements it is within the scope of the invention to use means independent of said hydraulic circuit for damping roller movements.

As described, the control pressures applied to the rollers are liquid pressures. It is obvious, however, that said pressure could be applied by a gaseous fluid instead of a fluid in the liquid state.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A variable speed transmission comprising input and output members having facing co-axial toric surfaces; a plurality of circumferentially-spaced rollers disposed between and in contact with said surfaces for transmitting torque from said input member to the output member; support means for each roller including pivot means providing for speed-ratio-changing travel of said roller across said toric surfaces by pivotal movement about an axis spaced from the axis of the toric surfaces and lying in a plane disposed between said toric surfaces and disposed perpendicular to said toric surface axis with each said roller being disposed radially inwardly of its said pivot axis with respect to said toric surface axis; each roller support means also including means providing for movement of its roller in a second mode such that in response to movement in said second mode speed-ratio-changing travel of the roller is initiated about its said pivot axis and also providing its roller with a freedom of movement between said toric surfaces for substantially equalizing the contact pressures of said roller on said toric surfaces; roller control means including means for imposing a fluid pressure force on each roller to effect movement of said roller in its said second mode for initiating said speed-ratio-changing travel of said roller, each roller being capable of movement in its said second mode independently of corresponding movements of the other rollers; and means including a fluid flow restriction for each roller for flow of a fluid therethrough upon movement of said roller in its said second mode of movement thereby damping vibrations of each said roller in its said second mode of movement.

2. A transmission as recited in claim 1 in which said second mode of movement of each roller is a tilting movement about an axis spaced from but parallel to a line through the points of contact of the roller with the toric surfaces.

3. A transmission as recited in claim 1 in which said second mode of movement of each roller is a linear movement along a path parallel to the axis of its pivotal mounting means.

4. A transmission as recited in claim 1 and including spring means for each roller opposing said fluid pressure force on said roller.

5. A transmission as recited in claim 4 in which the spring force on each roller is directed so as to tend to cause speed-ratio-changing travel of its roller in a direction for decreasing the speed of the transmission output member.

6. A transmission as recited in claim 1 including means operable for varying the magnitude of said fluid pressure force.

7. A transmission as recited in claim 1 and in which said pivot axis of each roller is disposed at right angles to the axis of rotation of said roller and further in which said roller freedom of movement between the toric surfaces for equalizing the roller contact pressures on said toric surfaces is in a direction perpendicular both to the axis of rotation of said roller and to the pivot axis of said roller.

8. A transmission as recited in claim 1 and including means for axially urging said toric surface members toward each other with a force which increases and decreases with increase and decrease in the torque on one of said members; and damping means operative to retard decreases in said axial force relative to a decrease in said torque but to permit said axial force to increase promptly with increase in said torque.

9. A transmission as recited in claim 1 in which said fluid pressure force imposing means includes a pair of chambers for each roller; means for supplying a relatively low fluid pressure to one of said chambers for urging its roller in the same direction as the tangential traction on said roller at the toric surfaces; means for supplying a relatively high fluid pressure to the other of said chambers for urging its roller in the opposite direction; and means operable to vary the magnitude of said last mentioned pressure.

10. A transmission as recited in claim 9 and including spring means for also urging each roller in the same direction as said relatively low hydraulic pressure.

11. A transmission as recited in claim 9 including means for reversing the fluid pressure connections to said chambers.

12. A variable speed transmission comprising input and output members having facing co-axial toric surfaces; a plurality of circumferentially-spaced rollers disposed between and in driving contact with said surfaces; means mounting each of said rollers for a pivotal first movement about a fixed axis for speed-ratio-changing travel across said surfaces and including means supporting each roller for an independent second movement, in response to changes in the tangential forces on said roller at said toric surfaces, to cause said speed-ratio-changing travel of said roller; means including hydraulic pressure means for imposing a force on said rollers opposing said roller independent second movement by said tangential forces; said force imposing means including a pair of chambers for each roller, means for supplying a relatively low hydraulic pressure to one of said chambers for urging its roller in the same direction as said tangential forces on said roller, means for supplying a relatively high hydraulic pressure to the other of said chambers for urging its roller in the opposite direction, and means operable to vary the magnitude of said last mentioned pressure; and first and second movable stop means for each roller, said first movable stop means having first positions in which for one direction of rotation of said input member they are effective to limit the range of speed-ratio-changing travel of the rollers and having second positions in which they are ineffective, said second movable stop means having first positions in which for rotation of said input member in the opposite direction they are effective to limit the range of speed-ratio-changing travel of the rollers and having second positions in which they are ineffective; and means operative for causing one of said stop means to move from their ineffective to effective positions and the other of said stop means from their effective to ineffective positions and for reversing the hydraulic pressure connections to said chambers for each roller.

13. A variable speed-transmission comprising input and output members having facing co-axial toric surfaces; a plurality of circumferentially-spaced rollers disposed between and in driving engagement with said surfaces; means mounting each roller for a pivotal first movement about a fixed axis for speed-ratio-changing travel across said surfaces and including means supporting each roller for independent second movement, in response to changes in the tangential forces on said roller, to cause speed-ratio-changing travel of said roller; means for damping said independent roller movements; and means for axially urging said toric surface members toward each other with a force which increases and decreases with increase and decrease in the torque on one of said members; and damping means operative to retard decreases in said axial force relative to a decrease in said torque but to permit said axial force to increase promptly with increase in said torque.

14. A variable speed transmission comprising input and output members having facing co-axial toric surfaces; a plurality of circumferentially-spaced rollers disposed between and in driving engagement with said surfaces; means mounting each roller for a pivotal first movement about a fixed axis for speed-ratio-changing travel across said surfaces and including means supporting each roller for independent second movement, in response to changes in the tangential forces on said roller at said toric surfaces, to cause speed-ratio-changing travel of said roller; and means including a fluid flow restriction for each roller for flow of a fluid therethrough upon said independent roller movements thereby damping such independent roller movements.

15. A variable speed transmission comprising input and output members having facing co-axial toric surfaces; a plurality of circumferentially-spaced rollers disposed between and in driving contact with said surfaces; means mounting each of said rollers for a pivotal first movement about a fixed axis for speed-ratio-changing travel across said surfaces and including means supporting each roller for independent second movement in response to changes in the tangential forces on said roller at said toric surfaces, so as to cause speed-ratio-changing pivotal travel of said roller; and means operative upon a roller reaching a limiting-speed-ratio position to prevent further speed-ratio-changing travel in said direction by causing said independent roller movement in a direction to reverse the direction of said speed-ratio-changing travel.

16. A variable speed transmission comprising input and output members having facing co-axial toric surfaces; a plurality of circumferentially-spaced rollers disposed between and in driving contact with said surfaces; means mounting each of said rollers for a pivotal first movement about an axis for speed-ratio-changing travel across said surfaces and including means supporting each roller for independent second movement in response to changes in the tangential forces on said roller at said toric surfaces, so as to cause speed-ratio-changing pivotal travel of said rollers; each said roller also including means providing for shifting freedom of said roller between said surfaces in a direction substantially perpendicular to the roller axis and its pivot axis; and means including a fluid flow restriction for each roller for flow of a fluid therethrough upon said independent roller movements thereby damping such independent roller movements.

17. A transmission as recited in claim 16 in which said rollers are disposed radially inwardly of the toric centerline of each of said toric surfaces.

18. A variable speed transmission as claimed in claim 14 and including roller control means having means for imposing a fluid pressure control force on each roller in opposition to the tangential forces on said roller, to regulate the speed ratio position of said roller.

19. A variable speed transmission as claimed in claim 18 and including means operable for varying the magnitude of said fluid pressure control force.

20. A variable speed transmission as claimed in claim 16 and including roller control means having means for imposing a fluid pressure control force of the same magnitude on each of said rollers in opposition to the tangential forces on said rollers, to regulate the speed ratio positions of said rollers.

References Cited in the file of this patent

UNITED STATES PATENTS

| 2,014,922 | Almen | Sept. 17, 1935 |
| 2,201,176 | Hayes | May 21, 1940 |
| 2,446,409 | Chilton | Aug. 3, 1948 |
| 2,850,910 | Kraus | Sept. 9, 1958 |
| 2,850,911 | Kraus | Sept. 9, 1958 |
| 2,907,220 | Weisel | Oct. 6, 1959 |